US009800349B2

(12) United States Patent
Hayami et al.

(10) Patent No.: US 9,800,349 B2
(45) Date of Patent: Oct. 24, 2017

(54) OPTICAL 90-DEGREE HYBRID CIRCUIT AND OPTICAL RECEIVER USING SAME

(71) Applicant: SUMITOMO OSAKA CEMENT CO., LTD., Chiyoda-Ku, Tokyo (JP)

(72) Inventors: Yuji Hayami, Tokyo (JP); Toshio Kataoka, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/389,426

(22) PCT Filed: Mar. 28, 2013

(86) PCT No.: PCT/JP2013/059166
§ 371 (c)(1),
(2) Date: Sep. 30, 2014

(87) PCT Pub. No.: WO2013/146968
PCT Pub. Date: Oct. 3, 2013

(65) Prior Publication Data
US 2015/0063810 A1    Mar. 5, 2015

(30) Foreign Application Priority Data

Mar. 30, 2012  (JP) ................................. 2012-080499

(51) Int. Cl.
*H04B 10/06* (2006.01)
*H04B 10/61* (2013.01)
(Continued)

(52) U.S. Cl.
CPC ....... *H04B 10/6166* (2013.01); *H04B 10/614* (2013.01); *H04J 14/0221* (2013.01); *H04J 14/06* (2013.01)

(58) Field of Classification Search
None
See application file for complete search history.

(56) References Cited

U.S. PATENT DOCUMENTS 5,052,051 A * 9/1991 Naito .................... H04B 10/61
398/204
7,796,894 B1 * 9/2010 Yao ..................... H04B 10/2569
398/152
(Continued)

FOREIGN PATENT DOCUMENTS

JP       2005-265901 A     9/2005
JP       2010-245772 A     10/2010
(Continued)

*Primary Examiner* — Ken N Vanderpuye
*Assistant Examiner* — David Lambert
(74) *Attorney, Agent, or Firm* — Taft Stettinius & Hollister LLP (57) ABSTRACT

An object of the present invention is to provide an optical 90-degree hybrid circuit which is capable of easily adjusting the optical power ratio between signal and local oscillator and suppresses an optical system of an optical receiver becoming complex and optical receivers using the same. The optical 90-degree hybrid circuit for demodulating multilevel phase-modulated signals corresponding to individual polarized waves by multiplexing an optical wave having a predetermined plane of polarization contained in signal and local oscillator that has the same wavelength as the signal and has been adjusted to circularly-polarized signal, and polarization-splitting the multiplexed signal includes polarization splitting means (polarization splitting) for extracting an optical wave having a predetermined plane of polarization from the signal, a polarization conversion element for rotating a plane of polarization of the optical wave extracted from the polarization splitting means, and a polarizer that determines a plane of polarization of the signal before multiplexing the signal with the local oscillator, and the polarization splitting means, the polarization conversion element, and the polarizer adjust intensity of the optical signal (VOA function) in cooperation with each other.

2 Claims, 6 Drawing Sheets

(51) Int. Cl.
*H04J 14/06* (2006.01)
*H04J 14/02* (2006.01)

(56) References Cited

U.S. PATENT DOCUMENTS

| | | | | |
|---|---|---|---|---|
| 7,936,999 B1* | 5/2011 | Hawryluck | ............ | H04B 10/60 398/152 |
| 2010/0254718 A1* | 10/2010 | Oda | ....................... | H04B 10/60 398/202 |
| 2012/0008951 A1* | 1/2012 | Mikami | ............... | H04B 10/613 398/65 |
| 2013/0236172 A1* | 9/2013 | Suzuki | ................. | H04B 10/612 398/43 |

FOREIGN PATENT DOCUMENTS

| JP | 2012-18225 A | 1/2012 |
|---|---|---|
| JP | 2012-182790 A | 9/2012 |

* cited by examiner

OPTICAL 90-DEGREE HYBRID CIRCUIT AND OPTICAL RECEIVER USING SAME

TECHNICAL FIELD

The present invention relates to an optical 90-degree hybrid circuit and an optical receiver using the same, and particularly to an optical 90-degree hybrid circuit for demodulating multilevel phase-modulated signals corresponding to individual polarized waves by multiplexing an optical wave of signal having a predetermined plane of polarization and local oscillator, and polarization-splitting the multiplexed signal and an optical receiver using the same.

BACKGROUND ART

Figure 1:
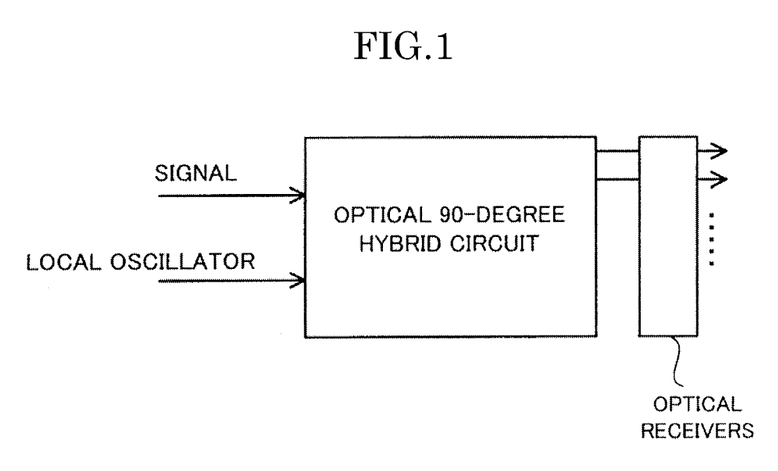
FIG. 1 is a block diagram illustrating an optical receiver including an optical 90-degree hybrid circuit of the related art.

There are optical communication techniques in which a quadrature phase shift keying (QPSK) signal, a dual polarization quadrature phase shift keying (DP-QPSK) signal, a quadrature amplitude modulation (QAM) signal, and the like are used. In these modulation methods, when a received signal is obtained, such as phase-modulated signal or quadrature amplitude-modulated signal and local oscillator (coherent optical wave) that serves as a reference are made incident on an optical 90-degree hybrid circuit, the signal and the local oscillator are being interfered, and interfering signal converted to an orthogonal relation is output as illustrated in FIG. 1. The interfering signal is detected by the optical receivers, and an in-phase (I) signal, a quadrature-phase (Q) signal, and the like are output.

Figure 2:
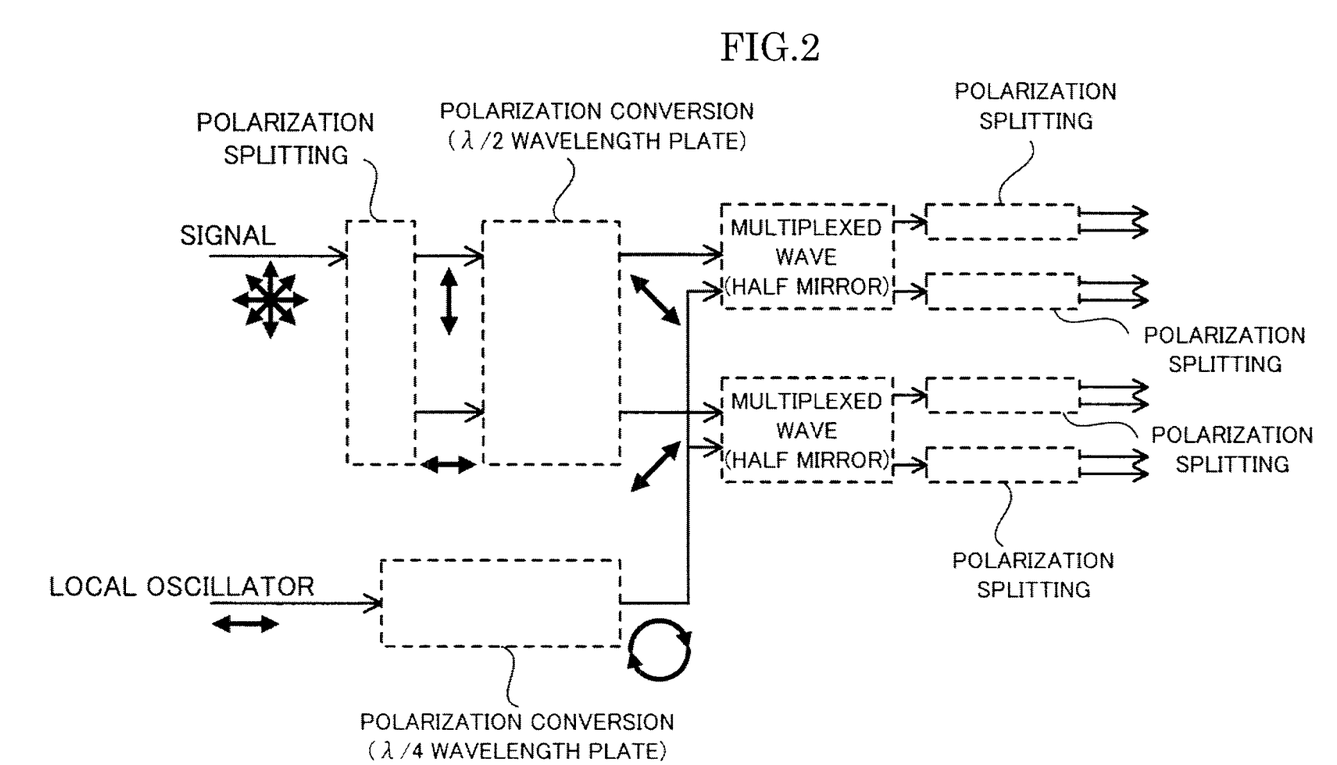
FIG. 2 is a view illustrating the main constitution of the optical 90-degree hybrid circuit of FIG. 1.

In the optical 90-degree hybrid circuit, as illustrated in FIG. 2, polarized multiplex signal with a rotation state of random polarization is input to the 90-degree hybrid circuit, and the polarized multiplex signal is split into a vertical polarization component and a horizontal polarization component by a polarization splitting element. The polarization-split vertical polarization component and horizontal polarization component are converted to a 45-degree sloped polarized wave and a 135-degree sloped polarized wave respectively by using a polarization conversion element ($\lambda/2$ wavelength plate) to rotate the planes of polarization 45 degrees.

Meanwhile, the local oscillator is converted to a circularly-polarized wave by using a polarization conversion element ($\lambda/4$ wavelength plate), and is multiplexed with two signals optical signals that have been converted to planes of polarization having slopes of 45 degrees and 135 degrees by using an optical multiplexing and de-multiplexing device (half mirror).

The multiplexed optical signal is then de-multiplexed, and two optical signals that are put into a differential relation (in phase and out of phase) by an individual optical multiplexing and de-multiplexing device are output. Four output optical signals in total output from two optical multiplexing and de-multiplexing devices are respectively input to the polarization splitting element, and thus are split into polarization-split IQ (In-phase, Quadrature-phase) signals. An example of constituting the above-described optical 90-degree hybrid circuit using a space optical system is described in patent literature No. 1.

In an optical receiver, the rating of an input signal to a section that amplifies an electric signal (Trans Impedance Amplifier; TIA) is set, and therefore it is not possible to receive an optical signal with a certain amount of power or more. For optical signal being input to the optical 90-degree hybrid circuit, the power ratio between the local oscillator and the signal needs to be sufficiently increased in terms of the signal qualities, which is limited by the input rating of the TIA.

The electric signal input to TIA (the value of an optical current output from the optical signal receiving element) is expressed as follows:

Electrical signal input to TIA ∝(signal power×local oscillator optical power)^0.5    (Expression)

Since the rating of TIA is within a certain range, in a case in which the power of the signal is increased, it is necessary to decrease the power of the local oscillator. To maintain the signal qualities after demodulation, it is necessary to sufficiently increase the power of the local oscillator compared with the power of the signal being input while the input rating of TIA is maintained. For example, in a case in which the signal power is excessively great, a sufficient power ratio between the local oscillator and the signal cannot be obtained.

Figure 3:
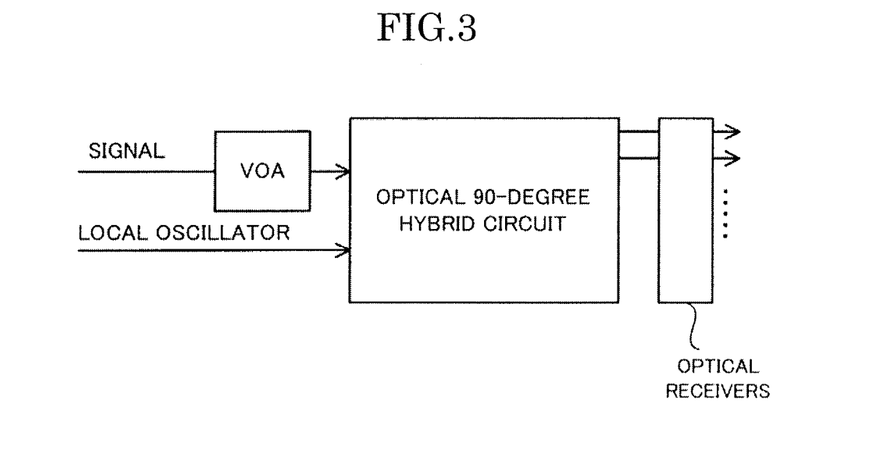
FIG. 3 is a view illustrating an example in which a variable optical attenuator (VOA) is used in the optical receiver including the optical 90-degree hybrid circuit of the related art.

In a case in which the power of the signal is adjusted while the power of the local oscillator is maintained to be constant, specifically, it is possible to adjust the power of the signal by using a variable optical attenuator (VOA) provided ahead of the optical 90-degree hybrid circuit as illustrated in FIG. 3. However, since the number of devices in a receiving system is increased due to the variable optical attenuator, there is a problem in that the constitution becomes large and complex.

In addition, in a case in which the variable optical attenuator is not used as illustrated in FIG. 1, the optical power ratio of the local oscillator to the signal is maintained at a certain level or higher, and therefore it is necessary to use a local oscillator source equipped with an optical power adjustment function. In this case, it becomes impossible to receive a signal having a certain amount of power or more due to the limitation by the above-described input rating of TIA.

CITATION LIST

Patent Literature

[Patent Literature No. 1] Japanese Patent Application No. 2012-26850 (Date of filing: Feb. 10, 2012)

SUMMARY OF INVENTION

Technical Problem

An object of the present invention is to solve the above-described problems, and provide an optical 90-degree hybrid circuit which is capable of easily adjusting the optical power ratio between signal and local oscillator and suppresses a signal receiver-related optical system becoming complex and an optical receiver using the same.

Solution to Problem

To achieve the above-described object, the present invention has the following technical features.

(1) An optical 90-degree hybrid circuit for demodulating multilevel phase-modulated signals corresponding to individual polarized waves by multiplexing an optical wave having a predetermined plane of polarization contained in signal and local oscillator that has the same wavelength as the signal and has been adjusted to circularly-polarized signal, and polarization-splitting the multiplexed signal, includes polarization splitting means for extracting an optical wave having a predetermined plane of polarization from the signal, a polarization conversion element for rotating a plane of polarization of the optical wave extracted from the polarization splitting means, and a polarizer that determines a plane of polarization of the signal before multiplexing the signal with the local oscillator, and the polarization splitting means, the polarization conversion element, and the polarizer adjust intensity of the optical signal in cooperation with each other.

(2) In the optical 90-degree hybrid circuit according to the above-described (1), the polarization conversion element is either a liquid crystal element or a $\lambda/2$ wavelength plate equipped with a rotation function.

(3) The optical 90-degree hybrid circuit according to the above-described (1) or (2), further includes optical signal quantity monitoring means for detecting the signal intensity that has penetrated through the polarizer, and the polarization conversion element is controlled by the optical signal quantity monitoring means so that intensity of the optical signal reaches a predetermined quantity.

(4) An optical receiver which demodulates multilevel phase-modulated signals corresponding to individual polarized waves by multiplexing an optical wave having a predetermined plane of polarization contained in signal and local oscillator that has the same wavelength as the signal and has been adjusted to circularly-polarized signal, and polarization-splitting the multiplexedsignal, includes the optical 90-degree hybrid circuit according to any one of the above-described (1) to (3).

Advantageous Effects of Invention

In the invention, the optical 90-degree hybrid circuit for demodulating multilevel phase-modulated signals corresponding to individual polarized waves by multiplexing an optical wave having a predetermined plane of polarization contained in signal and local oscillator that has the same wavelength as the signal and has been adjusted to circularly-polarized signal using the same wavelength as the signal, and polarization-splitting the multiplexed signal includes polarization splitting means for extracting an optical wave having a predetermined plane of polarization from the signal, a polarization conversion element for rotating a plane of polarization of the optical wave extracted from the polarization splitting, and a polarizer that determines a plane of polarization of the signal before multiplexing the signal with the local oscillator, and the polarization splitting means, the polarization conversion element, and the polarizer adjust intensity of the optical signal in cooperation with each other, and therefore it is possible to give a function of a variable optical attenuator to the optical 90-degree hybrid circuit, and it becomes possible to provide an optical 90-degree hybrid circuit which is capable of easily adjusting the optical power ratio between signal and local oscillator and prevents a signal receiver-related optical system from becoming complex. In addition, when the above-described optical 90-degree hybrid circuit is embedded in an optical receiver, it becomes possible to provide the optical de-modulator having the same action and effect.

In addition, since the polarization conversion element is either a liquid crystal element or a $\lambda/2$ wavelength plate equipped with a rotation function, it becomes possible to make the optical receiver-related optical system more compact.

Furthermore, since optical signal quantity monitoring means for detecting the intensity of the optical signal that has penetrated through the polarizer is provided, and the polarization conversion element is controlled by the signal quantity monitoring means so that the intensity of the signal reaches a predetermined quantity, it becomes possible to adjust the optical power ratio between signal and local oscillator to an appropriate output at all times.

DESCRIPTION OF EMBODIMENTS

Hereinafter, an optical receiver of the present invention will be described in detail using preferable examples. The present invention is an optical 90-degree hybrid circuit for demodulating multilevel phase-modulated signals corresponding to individual polarized waves by multiplexing an optical wave having a predetermined plane of polarization contained in signal and local oscillator that has the same wavelength as the signal and has been adjusted to circularly-polarized signal, and polarization-splitting the multiplexed signal which includes polarization splitting means for extracting an optical wave having a predetermined plane of polarization from the signal, a polarization conversion element for rotating a plane of polarization of the optical wave extracted from the polarization splitting means, and a polarizer that determines a plane of polarization of the signal before multiplexing the signal with the local oscillator, and in which the polarization splitting means, the polarization conversion element, and the polarizer adjust intensity of the optical signal in cooperation with each other. In addition, an optical receiver of the present invention includes the above-described optical 90-degree hybrid circuit embedded therein.

Figure 4:
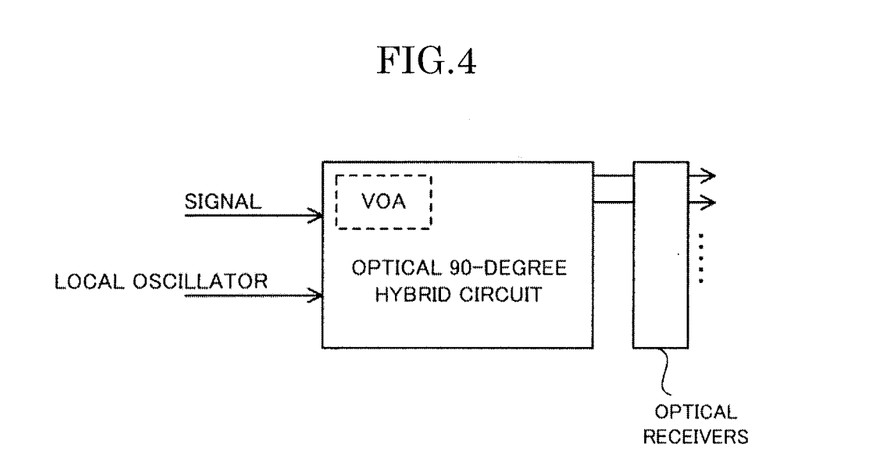
FIG. 4 is a block diagram illustrating the overview of an optical receiver including an optical 90-degree hybrid circuit of the present invention.

The optical 90-degree hybrid circuit and optical receiver of the present invention include a member having a variable optical attenuation (VOA) function embedded in the optical 90-degree hybrid circuit that multiplexes signal and optical oscillator, and polarization-splitted the multiplexed signal as illustrated in FIG. 4.

Figure 5:
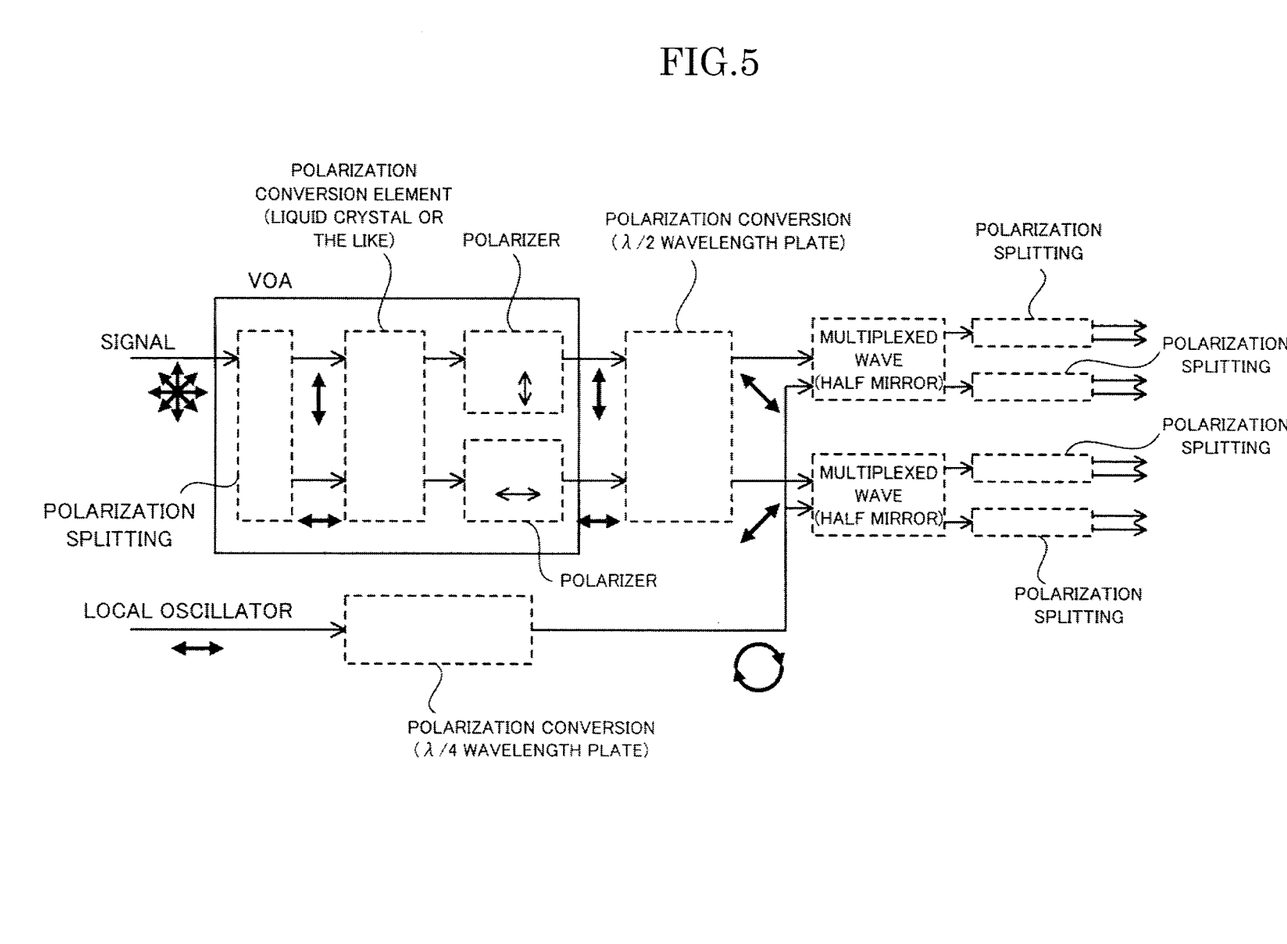
FIG. 5 is a view illustrating the main constitution of the optical 90-degree hybrid circuit having a VOA function of FIG. 4.

Specifically, signal input to the optical 90-degree hybrid circuit in a state of random polarization is split into a vertically-polarized wave and a horizontally-polarized wave by a polarization splitting element such as a polarization beam splitter as illustrated in FIG. 5.

The split optical signals having a vertical wave and a horizontal wave are respectively input to a polarization conversion element. A liquid crystal element can be used as the polarization conversion element. The liquid crystal element includes a liquid crystal sealed between two transparent substrates, and, when a voltage is applied to transparent electrodes provided on the transparent substrates, birefringence in accordance with the applied voltage is imparted to the liquid crystal.

Since the polarization conversion element (liquid crystal element) is imparted with birefringence by the voltage supplied by a control circuit, not illustrated, two optical signals input to the liquid crystal element are respectively polarization-converted to a certain polarization state by birefringence in the liquid crystal element. A polarizer allows the penetration of only vertically-polarized optical signal and horizontally-polarized signal out of the two polarization-converted optical signal. In the case of the present embodiment, the polarization conversion element "does not attenuate optical signal" in a case in which an operation of rotating the plane of polarization 0 degrees is carried out, and "extincts optical signal" in a case in which an operation of rotating the plane of polarization 90 degree is carried out. Therefore, it becomes possible to change the optical power after the signal penetrates through two polarizers by changing the voltage supplied to the liquid crystal.

As described above, it is easily understood that, when the polarization splitting element that is polarization splitting means for extracting optical waves having a specific plane of polarization from the signal, the polarization conversion element for rotating the plane of polarization, and the polarizer for determining the plane of polarization cooperate with each other, a variable optical attenuator (VOA) function is performed thereby. Since the variable optical attenuator uses the polarization splitting element as a part of components as described above, it is possible to realize a decrease in the number of components and an optical system becoming more compact.

In FIG. 5, a polarization conversion element ($\lambda/2$ wavelength plate) is provided to put the signal that has penetrated the polarizer on a plane of polarization having a predetermined angle. After the polarization conversion element, similar to the optical receiver illustrated in FIG. 2, the two optical signals that have penetrated through the polarizer are respectively interfered with local oscillator that has been converted to circularly-polarized signal by a multiplexing and de-multiplexing device (polarization combination element) such as a half mirror, and two sets of differential signal components are output. From four sets of signal output from the polarization combination element, an I (In Phase) signal and a Q (Quadrature Phase) signal are respectively extracted by using the polarization splitting element, and finally, a total of eight outputs are obtained.

Figure 6:
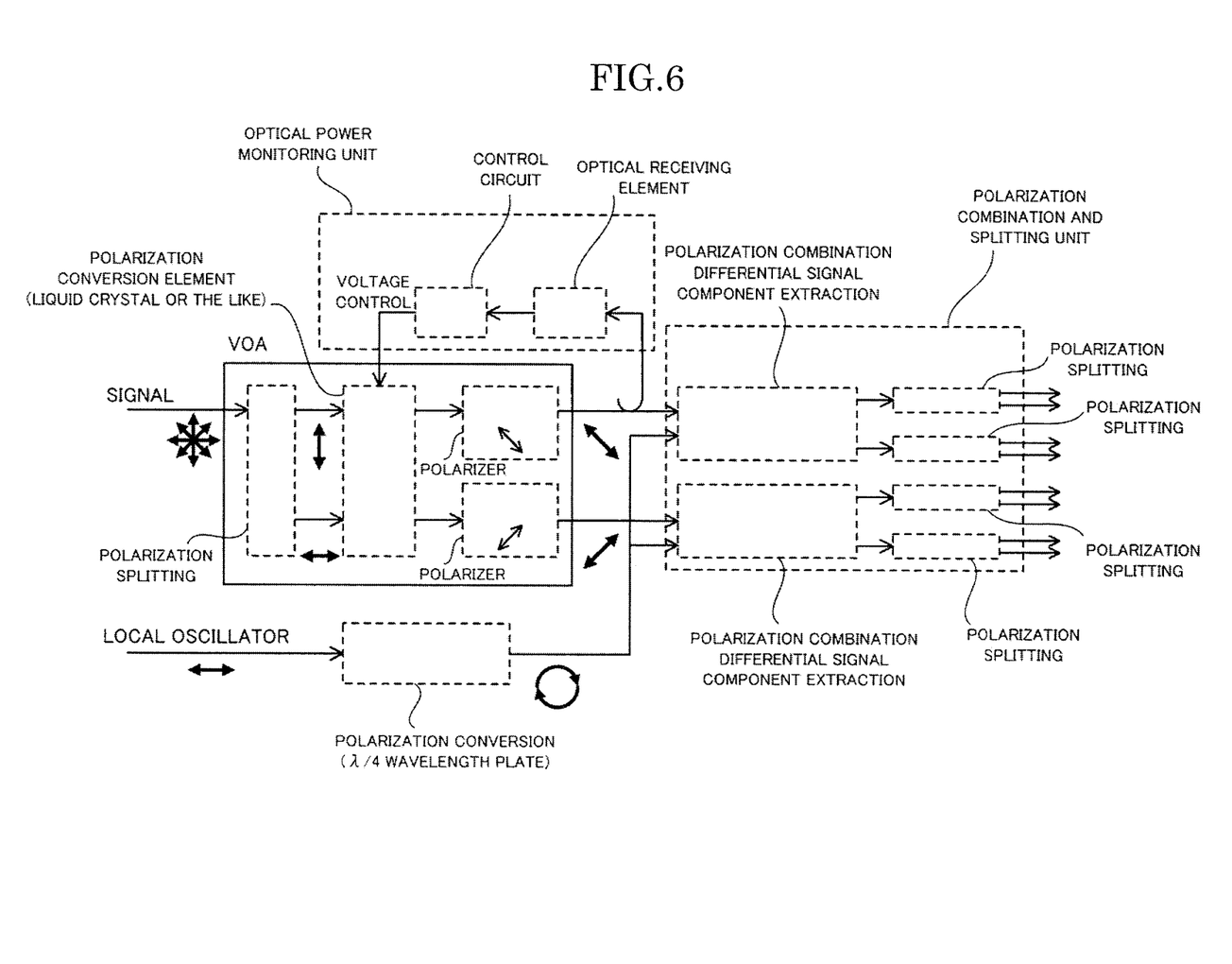
FIG. 6 is a view illustrating the main constitution of an optical receiver including the optical 90-degree hybrid circuit having the VOA function of FIG. 4 and an optical power monitoring unit.

In addition, the polarization conversion element such as the liquid crystal element has a temperature dependency of birefringence, and therefore it is possible to control a voltage applied to the liquid crystal so as to reach a desired optical power by branching one or two optical signals that have output from the polarizers and monitoring the optical powers of the optical signals as illustrated in the optical power monitoring unit of FIG. 6. That is, the optical 90-degree hybrid circuit of the present invention and the optical receiver using the same include optical signal quantity monitoring means for detecting intensity of the optical signal that has penetrated through the polarizer, and the polarization conversion element such as the liquid crystal element is controlled by the liquid quantity monitoring means so that intensity of the optical signal reaches a predetermined quantity.

In FIG. 6, the polarization conversion element ($\lambda/2$ wavelength plate) of FIG. 5 is not provided, and the angle of the polarizer is installed so that optical waves having a predetermined plane of polarization can be output in advance. Since the polarization conversion element (liquid crystal element) is imparted with birefringence by the voltage supplied by the control circuit, not illustrated, the two optical signals input to the liquid crystal element are respectively polarization-converted to a certain polarization state by birefringence in the liquid crystal element. The polarizer allows the penetration of only 45-degree linearly-polarized signal and 135-degree linearly-polarized signal out of the two polarization-converted optical signals.

Therefore, it becomes possible to change the optical power after the penetration of the two polarizers by changing the voltage supplied to the liquid crystal. In the case of the present embodiment, the polarization conversion element "does not attenuate optical signal" in a case in which an operation of rotating the plane of polarization 45 degrees is carried out, and "extincts optical signal" in a case in which an operation of rotating the plane of polarization 135 degrees (−45 degrees) is carried out.

Figure 7:
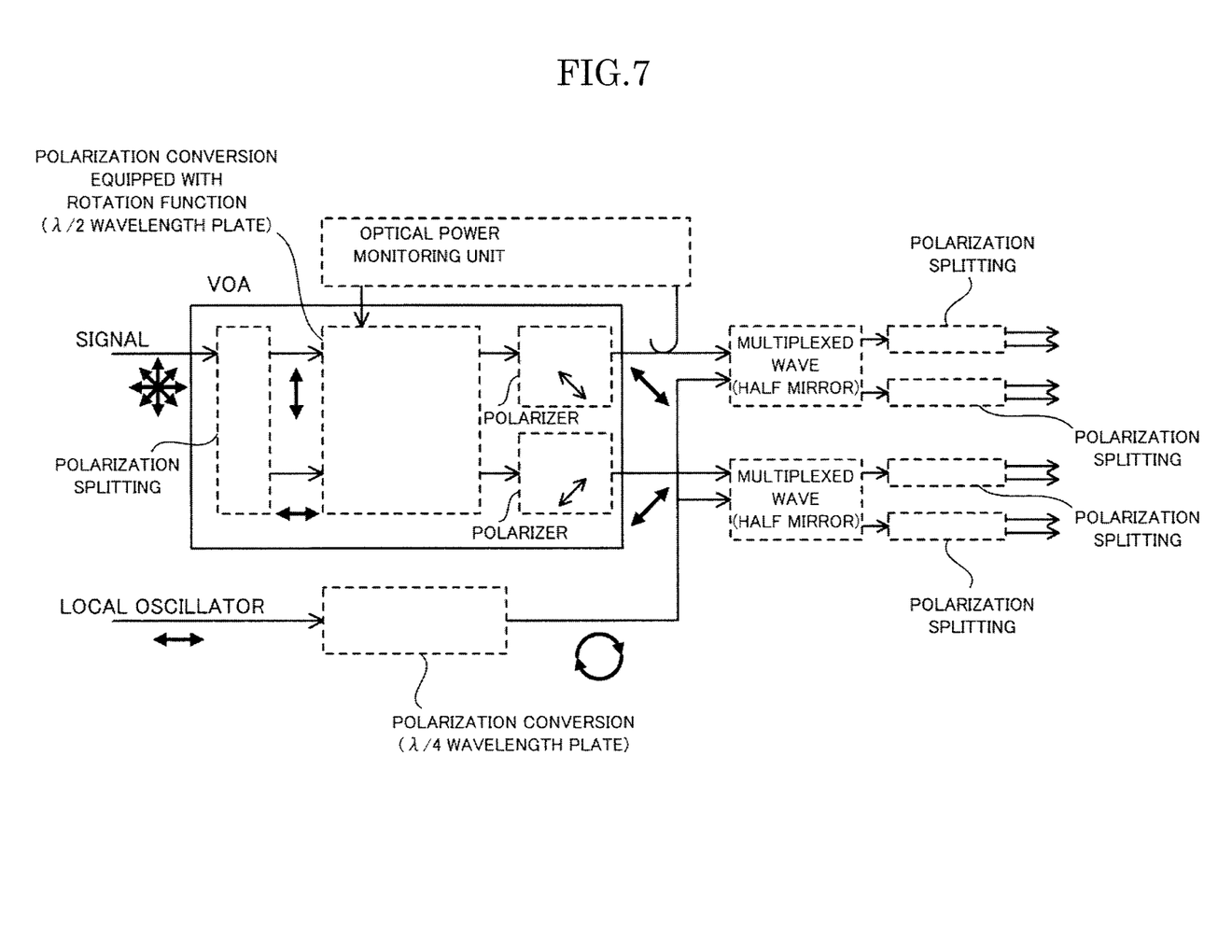
FIG. 7 is a schematic view of the optical receiver illustrating an example in which a polarization conversion element equipped with a rotation function (a $\lambda/2$ wavelength plate equipped with a rotation function) is used as the VOA of FIG. 4.

The polarization conversion element rotating the plane of polarization is not limited to the liquid crystal element. For example, it is also possible to use a $\lambda/2$ wavelength plate equipped with a rotation function as illustrated in FIG. 7. In FIG. 7, the optical 90-degree hybrid circuit is constituted so that the optical power monitoring unit rotates the $\lambda/2$ wavelength plate to a predetermined angle in accordance with the intensity of the detected signal.

In a case in which two mutually orthogonal polarized waves (horizontally-polarized wave and vertically-polarized wave) that have passed through the polarization splitting means and have been split pass through the polarization conversion element while the orthogonal relation is maintained, two polarizers disposed behind the polarization conversion element are preferably disposed so as to be orthogonal to each other (the angle formed by the polarization directions of two polarizers is 90 degrees), and is not supposed to be parallel to each other (the angle formed by the polarization directions of two polarizers is 0 degrees). When the angle of the polarizers is 90 degrees, it is possible to distinctively use the optical signal attenuation function from "not attenuating optical signal" to "extincting optical signal" in an appropriate manner; however, when the polarization direction of the polarizers is parallel, it is not possible to exhibit the effect of the present invention.

However, in a case in which the plane of polarization is rotated by disposing another polarization conversion means only in one optical signal path after the polarization splitting, what has been described above does not apply. In this case, the effect of the present invention is exhibited when the polarizer in the optical signal path rotates the plane of polarization as much as the same rotation angle of another polarization conversion element.

As an example, in an embodiment of FIG. 6, in a case in which a horizontally-polarized wave and a vertically-polarized wave are split by using the polarization splitting means, and then only the plane of polarization of the horizontally-polarized wave is rotated 90 degrees by using another polarization conversion means until the split polarized waves pass through the polarizer, the horizontally-polarized wave in the optical signal path in the bottom of the drawing turns into a vertically-polarized wave, and therefore the polarizer in this optical signal path through which the polarized wave passes needs to be parallel to the polarizer in the path for the vertically-polarized wave in the top of the drawing.

INDUSTRIAL APPLICABILITY

As described above, according to the present invention, it becomes possible to provide an optical 90-degree hybrid circuit which is capable of easily adjusting the optical power ratio between signal and local oscillator and suppresses a signal receiver-related optical system becoming complex and optical receivers using the same.

The invention claimed is:

1. An optical receiver comprising an optical 90-degree hybrid circuit for demodulating multilevel phase-modulated signals corresponding to individual polarized waves by multiplexing an optical wave having a predetermined plane of polarization contained in a signal and a local oscillator that has the same wavelength as the signal and has been adjusted to a circularly-polarized signal, and polarization-splitting a multiplexed signal, comprising:

polarization splitting means for extracting two optical waves from the signal, each of the two optical waves having a different predetermined plane of polarization;

one polarization conversion element that receives input of the two optical waves extracted from the signal, and rotates the plane of polarization of each one of the two optical waves extracted from the signal;

two polarizers, each one of the two polarizers determining the plane of polarization of one of the two optical waves, before multiplexing of the optical wave with the local oscillator; and signal quantity monitoring means for detecting intensity of one or more of the optical waves that have passed through one or more of the two polarizers, wherein the polarization splitting means, the polarization conversion element, and each of the two polarizers function together to adjust intensity of each of the two optical waves, and the polarization conversion element is controlled by the signal quantity monitoring means so that intensity of the optical waves reaches a predetermined quantity.

2. The optical receiver according to claim 1, wherein the polarization conversion element is a liquid crystal element or a λ/2 wavelength plate equipped with a rotation function.

* * * * *